United States Patent [19]

Imamura et al.

[11] Patent Number: 5,437,832
[45] Date of Patent: Aug. 1, 1995

[54] PROCESS FOR PREPARING A CERAMIC POROUS BODY

[75] Inventors: Masato Imamura; Kiichi Nakajima, both of Tokyo; Akira Yanagisawa, Saitama, all of Japan

[73] Assignee: Sintokogio, Ltd., Aichi, Japan

[21] Appl. No.: 148,659

[22] Filed: Nov. 5, 1993

[30] Foreign Application Priority Data

Nov. 6, 1992 [JP] Japan .................. 4-322397

[51] Int. Cl.6 ............................................. B22F 1/00
[52] U.S. Cl. ........................................ 419/2; 419/36; 419/38; 419/45; 264/63; 264/65
[58] Field of Search ............... 419/2, 7, 45, 57, 10, 419/13, 19, 40, 53, 36; 264/DIG. 36, 63, 65, 66, 344

[56] References Cited

U.S. PATENT DOCUMENTS

| | | | |
|---|---|---|---|
| 2,929,126 | 4/1956 | Bollack et al. | 264/63 |
| 3,365,291 | 1/1968 | Plumat et al. | 75/206 |
| 3,525,631 | 8/1970 | Brown et al. | 106/60 |
| 3,541,659 | 3/1960 | Cannell et al. | 29/182.2 |
| 4,689,197 | 8/1987 | Groll et al. | 419/23 |
| 4,882,304 | 11/1989 | Novich et al. | 501/32 |
| 4,961,778 | 10/1990 | Pyzik et al. | 75/230 |

OTHER PUBLICATIONS

M. S. Newkirk, A. W. Urguhart, H. R. Zwicker, and E. Breval, "Formation of Lanxide ceramic composite materials," Journal of Materials Research, vol. 1, No. 1, Jan./Feb. 1986, pp. 81–89.

Masahiro Yoshimura, Masao Nishioka, Nobuo Ishizawa, and Shigeyuki Somiya, "Synthesis of AlN and TiN for Al and Al-Ti alloy by arc image heating," Journal of Materials Science Letters, vol. 9, 1990, pp. 322–325.

Shigetamo Matsuo, Katsutoshi Komeya, and Yoshiaki Matsuki, "Sintering in the System AlN-Al in Nitrogen Gas," Journal of the Ceramics Association of Japan, vol. 72(2), 1965, pp. 82–86.

Masato Imamura, Akira Yanagisawa, Hiroyuki Noguchi, and Takeo Nakagawa, "Production of Porous Sintered Metal by Slurry Casting," Journal of the Japan Society of Powder and Powder Metallurgy, vol. 35, No. 7, Oct. 1988, pp. 625–628.

Weast, editor, *CRC Handbook of Chemistry and Physics* 49th ed., p. F-73.

*Primary Examiner*—Donald P. Walsh
*Assistant Examiner*—Anthony R. Chi
*Attorney, Agent, or Firm*—Fish & Neave; Edward Etkin

[57] ABSTRACT

An improved process is provided for preparing a porous ceramic product. By this process, a mixture of metal grains, ceramic grains, and short glass fibers is molded by a slurry casting method and dried and then sintered by heating in an oxidizing or nitriding gaseous atmosphere.

10 Claims, 11 Drawing Sheets

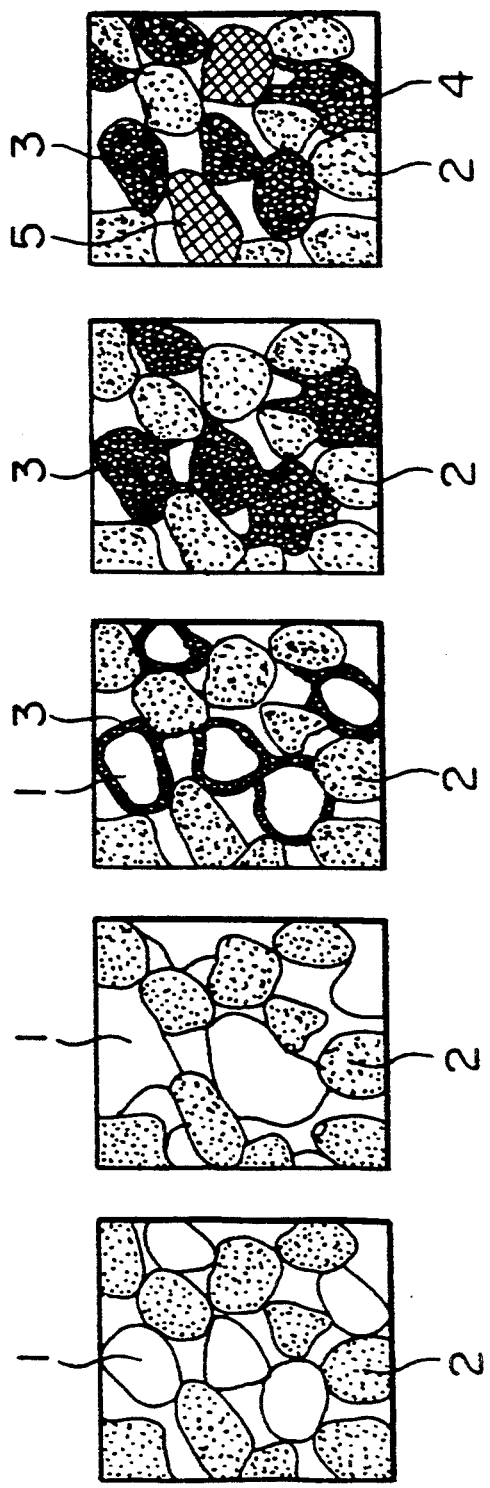

PROCESS FOR PREPARING A CERAMIC POROUS BODY

BACKGROUND OF THE INVENTION

FIELD OF THE INVENTION

This invention relates to a process for preparing a ceramic porous body, specifically to a process for preparing a ceramic porous body whose process uses the reaction sintering of a metal-ceramic mixture molded by a slurry casting method.

PRIOR ART

For the preparation of a sintered ceramic product the generally adopted conventional method is one in which a green molded product is prepared by compression molding ceramic grains by a press and then heat-sintering the product. However, this method has problems in the high preparation cost and limitation of the shape and size due to the use of a mold. To form a complicated shape, a method of mixing a thermoplastic resin with ceramic grains and subjecting the mixture to injection molding has been conducted. This method has problems such as the segregation of the components in the molding process, and the complexity of the degreasing process, in addition to the limitation on dimensions. As a more simple method to form a product of a complicated shape, one is used in which ceramic grains are suspended in a solvent to prepare a slip, the suspension is cast in a mold of porous material such as gypsum, with the solvent being absorbed by the porous material to form a green compact. However, this method has problems in that only grains having small diameters can be used and in that the cost for preparation is high because the removal of water is time-consuming and this results in requiring many kinds of molds.

In addition to the above, since the sintering temperature of ceramic grains is as high as 0.5–0.8 times their melting point or the decomposition temperature a high-temperature oven is necessary for sintering the ceramic grains and thereby the preparation cost gets higher.

A method has been conducted by Yoshimura (J. Materials Sci. Let., 9 (1990) 322–325) in which a metal is melted in a gas atmosphere at a high temperature and gas-reacted metal compound grains are continuously precipitated on the surface of the molten metal. However, by this method the molten metal is consumed and becomes hollow, and the resulting gas-reacted metal compound takes an irregular shape, unable to form a stable shape. Because of this fact, a method has been conducted by M. S. Newkirk (J. Mater. Res. 1(1) (1986), 81–89) in which the voids among grains or a molded porous product placed on a molten metal are impregnated with the molten metal to form a shaped product. This does not necessarily give a product of a stable shape since this method is accompanied by the movement of the molten metal.

Also, an attempt has been made to heat metal grains or a molded product thereof in a gas atmosphere to produce a gas-reacted metal compound. However, this method has a drawback in that a gas-combined product is not readily produced since sintering among metals takes place first. To resolve this drawback a method has been conducted in which gas-reacted metal compound grains are interposed as an admixture among metal grains. However, the diameters of ceramic grains are smaller than those of metal grains and the obtained product is a grain compact. Thus, as Matsuo et al. reported (Yogyo Kyokaishi (J. Ceram. Asoc. Japan), 73(2) (1965), 82–86), since a molten metal is bled when sintering is done, no great amount of metal grains can be included in the product.

Since the sintering of the usual ceramics is accompanied by a change in the shape and by a shrinkage of about 10–30%, the size of the sintered product cannot be controlled. Thus, a method is used where a low temperature-calcinated product that is not completely sintered is produced and that calcinated product is roughly processed and then completely sintered. Accordingly, the method requires complicated processes and it has been difficult to produce a porous sintered body of a large size and complicated shape with good air permeability.

SUMMARY OF THE INVENTION

The present invention has been conceived to resolve said problems. The object of the present invention is to provide a process for readily preparing at a low cost a sintered porous product with a large size and a complicated shape, said product having a good porosity and mechanical properties and being suitable, from the aspect of a filtering function, for the filtration of gas, i.e., compressed air, various kinds of gases, or steam, and the filtration of a liquid, i.e., water, a aqueous solution, an electrolyte, oils, a molten product of a synthetic resin, or a molten metal; from the aspect of a separation or concentration function, for the separation or concentration of gas, i.e., a mixed gas or a gas equivalent, or for the separation or concentration of a liquid, for instance, by the reverse osmosis method, etc.; from the aspect of the breathability through communicating pores, for devices for the blowing of gas, i.e., a base for transporting grains and granular material, an aeration (an air diffuser pipe), an air roll, or air bearing, for relieving gas, i.e., for a gas passage, a vent hole, a vacuum leakage valve, a vacuum chuck, or a breathable or durable mold, for a spouting liquid, i.e., for a fluid injection electrode, a surface plate for spouting an abrasive grain mixture slurry; from the aspect of shock absorption, for a sound-deadening material, i.e., a sound-deadening or sound adsorbing material for a pneumatic machine, for a cushioning material, i.e., a material for preventing the pulsation of compressed gas, or a damping material, for a compressed elastomer, i.e., a shock absorber for a sealing material; from the aspect of a high specific surface, for a material for chemical reaction, i.e., a catalyst, a carrier for a catalyst, a sensor, or a battery electrode material, or for a material for physical action, i.e., an adsorbing material, for a heat transferring material, i.e., antiflashing material, a heat-exchanger element, or a heating element; from the aspect of capillarity, for transferring a liquid, i.e., for a wick or a feedwater roller, for a feeding liquid, i.e., for a sweat-cooling material, a humidifier, a mist lubricator, an ink roller, or a bearing; from the aspect of flow control, for controlling a flow or a flow rate, i.e., a dispensing flow plate or a dispersing flow plate, or for controlling a gas boundary layer.

To achieve the object the present invention adopts a method in which an aggregate consisting of metal grains and ceramic grains, to which fibers may be optionally added, is mixed with a binder with stirring to form a slurry mixture, which is then cast in a mold, and solidified to obtain a hardened product, the product is dried, and after drying, is heated in an ambient atmosphere, and sintered.

When sinterable metal grains and ceramic grains are used, or they are used together with fibers, it is most preferred to use metal grains that can be reaction-sintered with the atmosphere or/and ceramic grains or//and fibers, and to heat them to such a temperature that causes reaction sintering.

DETAILED DESCRIPTION

The present invention will now be explained in detail.

FIG. 1 shows a molded product. It consists of a mixture of metal grains 1 and added ceramic grains 2.

FIG. 2 shows a ceramic porous body sintered in a gaseous atmosphere. It consists of a structure of metal grains 1 bonded to added ceramic grains 2. This is the case in which the gaseous atmosphere is inactive to, or metal grains are not chemically combinable with, the atmosphere.

FIGS. 3, 4, and 5 show examples of the ceramic products obtained by the present invention.

FIG. 3 shows a ceramic porous body that is obtained by sintering in a gaseous atmosphere. It consists of a structure of unreacted metal grains 1, added ceramic grains 2, and compound grains 3 obtained by chemically combining metal powders with an atmospheric gas, bonded to one another.

FIG. 4 shows a ceramic porous body sintered in a gaseous atmosphere. It consists of a structure of added ceramic grains 2 bonded to compound grains 3 obtained by chemically combining metal grains with an atmospheric gas. In this case, if the compound grains 3 that are chemically combined with the atmospheric gas are the same compound as the added ceramic grains 2, they will become integrated with each other. If they are different, they will form a mixed structure.

FIG. 5 shows a ceramic porous body obtained by sintering in an atmospheric gas. It consists of compound grains 3 obtained by chemically combining metal grains with the atmospheric gas, or compound grains 4 obtained by chemically combining metal grains with the decomposed gas of added ceramic grains, added ceramic grains 2, and metal 5 produced by the decomposition of added ceramic grains, bonded to one another.

The process for preparing a ceramic porous body by the present invention is as shown in FIG. 6. To obtain a ceramic porous body that is aimed at by the present invention, metal grains are first mixed with ceramic grains. Fibers, if used, are added to metal grains and ceramic grains, and then a binder is added thereto, and the thus-added mixture is thoroughly mixed with stirring to give the mixture slurry 6. The amount of metal grains to be used is selected from the range of above 0 to 100% by volume of the total amount of metal grains and ceramic grains. The amount of ceramic grains to be used is selected from the range of 0 to below 100% by volume of the total amount of the metal grains and ceramic grains. The amount of fibers, when used, is below 50% by volume of the total amount of metal grains and ceramic grains.

The metal grains are elements that produce ceramics by chemically combining with gases. They include, for example, Al, Si, B, Be, Ti, Cr, Ta, Te, Pb, Sn, Zn, and alloys thereof, among which one or more kinds are selected to be used.

The ceramic grains are those having a high fire resistance and a small deformation ratio at high temperatures, and are obtained by chemically combining metal grains with gas. They include, for example, oxides such as alumina, glass, mulite, barium titanate, zinc oxide, copper oxide, and tin oxide, and nitrides such as aluminum nitride, silicon nitride, titanium nitride, and zirconium nitride, carbides such as titanium carbide, silicon carbide, and boron carbide, and borides such as titanium boride and zirconium boride, among which one or more kinds are selected to be used.

The fibers may be long fibers, but they are apt to produce fiber balls. Thus, short fibers having an aspect ratio of 50 or less are practical. For the short fibers substances obtained by cutting fine lines, and whiskers can be properly used. It is usually proper to add fibers to a mixture of metal grains and ceramic grains in an amount of below 50% by volume based on the total amount of metal grains and ceramic grains. The addition of fibers improves dispersion of a binder and a mixture of metal grains and ceramic grains, and thereby the occurrence of cracks on drying and sintering is prevented. From the aspect of moldability and the functional improvement of fibers, it may also be proper to use the material of the same type or quality as that of the metal grains and ceramic grains. It is also proper to use fiber reinforcement.

For the binder, self-curing liquid binders for molding sand such as a water-soluble phenolic resin, specifically, a liquid of hydrolyzed ethyl silicate, may preferably be used. The first reason for this is that the catalytic action of hydrolyzed ethyl silicate causes drastic gelling and the binder has such properties that it changes from a fluidized state to a non-fluidized one. That is, when a self-curing liquid binder is used, by adjusting the added amount of the hydrolyzed ethyl silicate curing catalyst, the slurry mixture obtained by mixing the hydrolyzed product of ethyl silicate with metal grains and ceramic grains can have a flowability sufficient to be easily cast in a mold and can be rapidly solidified after molding to such a strength that the molded product is readily separated from the mold. The use of the binder improves the productivity without the need for a mold having a high strength or an expensive press.

The second reason is that since the gelled product of the hydrolyzed ethyl silicate consists of 20% silica and 80% ethyl alcohol, when a product molded and cured, with the gelled product as a binder, is dried, the ethyl alcohol evaporates and the voids remaining after evaporation result in fine communication pores, contributing to the formation of pores in a sintered product.

Generally the amount of the binder may be properly selected within the range of 10 to 80 wt % of the total amount of metal grains and ceramic grains, and if used, fibers, depending on the grain diameter distribution. The amount should be as small as possible. The lowest amount used should be such that the slurry mixture does not flow without the application of vibrations. However, from the aspect of workability, to make the flowability of the mixture better, a higher amount is desirable. Since a high amount of the binder often causes the segregation of the components, thereby causing malformation, and a large amount of the binder should be removed, it is costwise undesirable. Accordingly, the highest limit of the amount should be lower than the amount at which the binder begins to separate from the mixed grains of the metal and ceramic. When a material is prepared, the binder may be colloidal silica, carbon dioxide-cured water-glass, or metal silicon-added water-glass, instead of the hydrolyzed ethyl silicate, and if necessary an evanescent organic compound may be added.

The slurry mixture 6 obtained as shown above is cast in a flask 7 and is cured. In this process a shape conversion may also be conducted by setting a model or an actual product 8 in the flask. Then the thus-obtained product is placed in an oven to be heated and sintered in a gas atmosphere.

Due to the cast molding the shape and size of the obtained product allows a high degree of free choice. Thus not only a flat product, but also a tubular product, a product having curved surfaces, and a product that has a three-dimensional structure, can be freely formed. The cast molding can be, depending on the kind of binder, any of vacuum knead cast molding, vibration cast molding, etc., but when a large amount of the binder is used, gravity cast molding may also be adopted. In this case it is more effective to pressurize a slurry mixture in a mold with a punch, because by pressurization a surplus binder in the material, and air bubbles included in a solvent, can be flashed and removed from the system, and a molded product with minimum irregular shapes can be obtained. Also, since metal grains and ceramic grains are in greater contact, accelerated sintering can be expected. However, excessive pressurization is not desirable since a plastic deformation of the grains is caused and this requires an increase in the rigidity and size of a pressurization machine. Accordingly, generally the applied pressure may preferably be as low as a surface pressure of 60 Mpa or lower, and the lowest limit of the pressure may be about 0.3 Mpa. A fluid pressure molding with such a low pressure makes it possible to prepare a molded product having less defects at a low cost by using a machine with a simple structure. The thus-obtained molded product is released from the mold as shown in FIG. 7, and then the released product is air-dried for 1 to 48 hours to prevent cracking and the occurrence of deformation. If necessary, that is, for example, when a binder contains an evaporating component, primary calcination may be conducted, in place of or in addition to air drying, by a method in which the molded product 9 is subjected to direct ignition or vacuum drying.

The thus-obtained molded product 9 is then sintered in a gaseous atmosphere. This gaseous atmosphere may be an oxidizing, nitriding, or silicifying one. The oxidizing atmosphere may be air or oxygen-added air. The nitriding atmosphere may be nitrogen gas or ammonia gas. The silicifying atmosphere may be a gas of heated silicon or a gas of heated silicon suboxide. Although the sintering conditions depend on the compounding ratio of the molding materials and the average grain sizes of metal powders and ceramic powders and the kinds of casting molds, generally the sintering temperature may preferably be the melting point of the added metal or higher, and lower than the melting point or the decomposition point of the added ceramic grains, and desirably about 1673 K. or lower. The sintering period may be 1–50 hours. The reason that the upper limit of the sintering temperature is made to be lower than that for sintering ceramics is that sintering may be conducted at a low temperature so that an expensive sintering oven can be avoided. In this process, making a ceramic of metal grains by gaseous reaction and sintering the ceramic proceed simultaneously to provide a sintered product.

EXAMPLE 1

Aluminum grains having an average grain diameter of 20 $\mu m$ were used for the metal grains and alumina grains (average grain diameter of two levels: 4 $\mu m$ (alumina A42-6) and 44 $\mu m$ (alumina A-12), both are prepared by Showa Renko K.K.) were used for the ceramic grains in various compounding ratios, and both were kneaded. Then hydrolyzed ethyl silicate was added as the binder to form a slurry, the thus-obtained slurry was kneaded by vibrations, and the kneaded product was subjected to vacuum degassing. The thus-obtained product was cast in an aluminum mold to form a specimen of $\Phi$ 10×20 mm. After the alcohol was removed by air drying, sintering was conducted in a gaseous atmosphere for 6 hours. In this Example, vibration slurry casting, which is one of the non-pressure molding methods, was used for molding. This method is characterized in that it makes possible charging grains into the mold without the need to use a durable mold, and in that an air-hardening inorganic binder (silicate sol) is used for a solvent, and thus a relatively uniform molded product can be easily obtained. The amount of the binder necessary for molding changes as shown in FIG. 8, depending on the grain size distribution and compounding ratio of the molding materials. According to the differential thermogravimetric analysis of the molded product, weight increases due to oxidization were shown at a temperature of about 1123 K. or higher. Thus, sintering was conducted at 1123 K. (900° C.) and 1573 K. (1300° C.). It is recognized that, as shown in FIG. 9, the compressive strength of the sintered product increases as the amount of the aluminum increases and that dimensional shrinkage gets smaller as the expansion by oxidation reaction gets larger. In the use of alumina having large grains the dimensional change tends to be small. The reason appears to be that if the average diameter of the grains used is larger, a greater amount of a binder is necessary, and thus the amount of silica remaining between grains gets larger, such that the intergranular separation can be completely maintained to enable oxidation progress.

Although by the oxidation and sintering of metal aluminum grains a certain amount of aluminum remains, the direct oxidation of aluminum can produce a porous alumina which has little dimensional change at a low temperature.

EXAMPLE 2

An alumina having an average grain diameter of 20 $\mu m$ and aluminum-12% silicon having an average grain diameter of 25 $\mu m$ were used for metal grains, and a mulite having an average grain diameter of 29 $\mu m$ was used for ceramic grains in various compounding ratios, and both were kneaded. Then hydrolyzed ethyl silicate was added as the binder to the kneaded product. The product was then kneaded by vibrations to form a slurry and was vacuum-degassed, and then cast in an aluminum mold to form a specimen having $\Phi$ 10×20 mm. The alcohol was removed from the specimen by air drying and the specimen was then sintered in a gaseous atmosphere for 6 hours. Due to the similarity in the grain size distribution of aluminum grains or aluminum-12% silicon grains and that of alumina grains as shown in FIG. 10, the amount of the binder was almost constant. The porosity of the molded product hardly changed when the sintering temperatures were 823K. and 873K., which are close to the melting point of aluminum, as shown in FIG. 11. However, when the sintering temperature was raised to 1173K. (550° C.) and 1573K. (600° C.) it was observed that the porosity decreased and that the compressive strength got larger. It was found that this tendency is eminent when the amount of the aluminum is 28 vol. % or more, and this tendency is greater if the amount of aluminum is greater. Where the amount of aluminum was 78 vol. % or more, a sweating phenomenon, that is, the flowage of molten aluminum onto the surface of the specimen, was observed. When aluminum-12% silicon grains were used, sweating at a relatively low temperature, compared to aluminum, was observed. The sweating seems to depend on the amount of the molten eutectic liquid. As shown in FIG. 12, the dimensional change in aluminum-alumina-based molded products obtained in this Example is within 0.1%, which is below that of the aluminum-alumina-based molded products obtained in Example 1. Such a small change is considered to be due to the effect of the grain size distribution. Generally, when the sintering temperature increases the sintered product shrinks to a greater extent. Sintering at 1537K. shows an expansion of 0.4% for about 40 vol. % aluminum. The reduction and oxidation reaction (thermit reaction) between silica and aluminum in mulite accelerates the internal oxidation of aluminum to form an alumina+silicon composite.

EXAMPLE 3

Aluminum grains having an average grain diameter of 20 μm were used for metal grains, and alumina grains (average grain diameter of two levels: 4 and 44 μm) were used for ceramic grains in various compounding ratios, and both were kneaded. Then hydrolyzed ethyl silicate was added as the binder to form a slurry. The slurry was kneaded by vibrations and was subjected to vacuum degassing followed by casting in an aluminum mold to form a specimen of Φ 10×20 mm. After the alcohol was removed by air drying, sintering was conducted in a nitrogen atmosphere for 6 hours. After X-ray diffraction and determining the mechanical properties of the sintered aluminum nitride product the sintering behavior of the sintered aluminum nitride product was examined. As in the experiment of direct oxidization in Example 1, alumina grains having two levels of grain-diameter distribution relative to aluminum grains were used. The conventionally reported sweating phenomenon of aluminum was not observed for the aluminum grains of a low amount, such as about 20% of aluminum, but was observed only for the aluminum grain of a high amount, such as 78% or more aluminum. It is considered that, since the specimen in this experiment is a porous product obtained by non-pressure molding, sufficient spaces among the ceramic grains were present. When the average diameter of the ceramic grains was below that of aluminum grains, the dimensional shrinkage was 4%. As shown in FIG. 13, the strengths were substantially constant. When the average grain diameter of ceramic grains was above that of the aluminum grains, the strengths increased linearly. In contrast, when the content of the aluminum was 50 wt. % or more, shrinkage was significant, and the sintering behavior was different from that in the oxidation sintering of aluminum. It is considered that this behavior was caused by the nitriding reaction of aluminum among ceramic grains on the surface of the specimen. As shown in FIG. 14, it was confirmed that the sintering of the aluminum nitride composite material showing dimensional expansion was caused by the nitriding sintering of the aluminum-alumina grains.

As explained above, prominent effects, such as a ceramic porous body with good porosity and mechanical properties being prepared at a low cost by simple processes, are obtained by the present invention.

EXAMPLE 4

Aluminum grains having an average grain diameter of 15 μm were used for the metal grains and alumina grains having a broad grain diameter distribution and an average grain diameter of 38 μm were used for the ceramic grains in various compounding ratios, and both were kneaded. Then hydrolyzed ethyl silicate was added as the binder to form a slurry, the thus-obtained slurry was kneaded by vibrations and the kneaded product was subjected to vacuum degassing. The thus-obtained product was cast in an aluminum mold to form a specimen of Φ 10×20 mm. After the specimen was removed from the mold and then subjected to air drying, it was sintered in the atmosphere at 1573 K. When the specimen was formed by adding 37% by volume of aluminum, the oxidation behavior of the specimen upon sintering became uniform. Thus a 37 vol. % aluminum-containing slurry was cast in three kinds of aluminum molds to form specimens of Φ 10×20, Φ 20×43, and Φ43×53 mm. Even though the same slurry was used, a density change depending on the difference among specimen sizes (mass effect) was observed. Thus, the effect of using different amounts of a binder was examined using the same 37% aluminum-containing specimens. As shown in FIG. 15, in all of the specimens, as the amount of the binder increased the specific gravity tended to get lower. However, significant changes occurred for molded products in which 26% by weight of the binder was contained. That is, although portions of the same slurry were used for molded products, the densities of the products were different. This shows that the slurry in this batch was nonuniform.

When, to resolve this problem, alumina fibers (manufactured by Nichias, Φ 3×100 μm) were compounded, as shown in FIG. 16, the variations in density of the molded products decreased. Although the tendency of nonuniformity in the case of the aforementioned 26% binder is most significant, the addition of 4% by volume or more of the fibers makes the variation settle in a certain range. As the amount of added fibers increases the compressive strength also increases and the variation in porosities decreases.

BRIEF DESCRIPTION OF DRAWINGS

FIG. 1 is an enlarged view of a green molded product.

FIG. 2 is an enlarged view of a product of a bonded structure consisting of metal grains that are not chemically combined with gas and added ceramic grains in a ceramic porous body obtained by sintering the molded product in a gaseous atmosphere.

FIG. 3 is an enlarged view of a product of a bonded structure consisting of partially gas-reacted metal compound grains, with unreacted metal grains remaining, and added ceramic grains bonded to said compound grains, in a ceramic porous product obtained by sintering the molded product in a gaseous atmosphere.

FIG. 4 is an enlarged view of a product of a bonded structure consisting of gas-reacted metal compound grains completely sintered, and added ceramic grains, in a ceramic porous product obtained by sintering the molded product in a gaseous atmosphere.

FIG. 5 is an enlarged view of a product of a bonded structure consisting of metal compound grains that are chemically combined with gas, metal compound grains that are chemically combined with a decomposition gas of added ceramic grains, added ceramic grains, and a metal produced by the decomposition of added ceramic grains, in a ceramic porous body obtained by sintering in a gaseous atmosphere.

Figure 6:
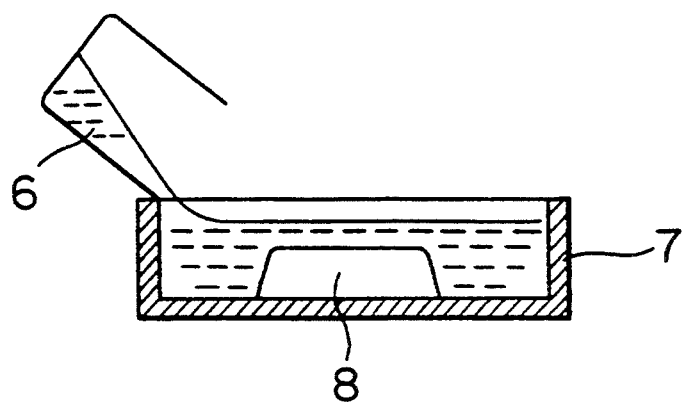
FIGS. 6 and 7 are sectional views that schematically show a production process for preparing a ceramic porous body obtained by the present invention.
Figure 7:
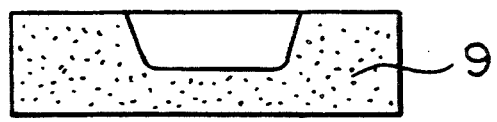
Figure 8:
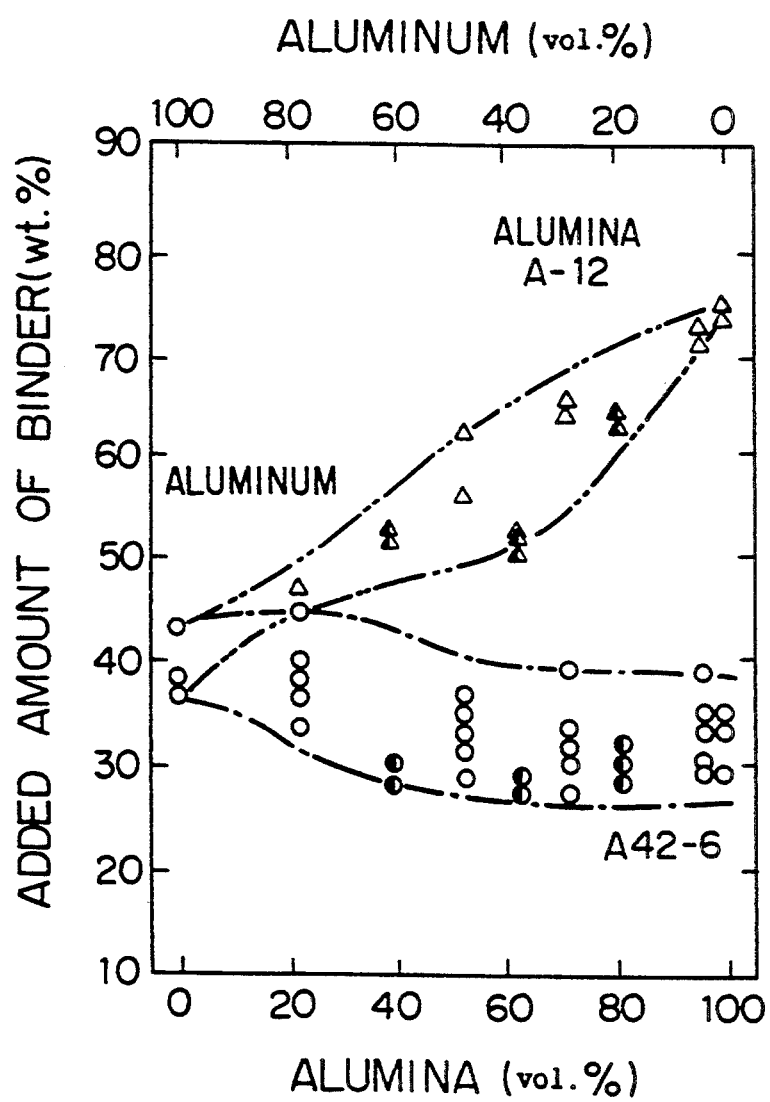
FIG. 8 is a graph that shows the amount of a binder necessary for forming a slurry of a mixture of aluminum grains and an alumina having a different average grain size. In this graph △ and ▲ show the data obtained by using alumina A-12 as the ceramic grains, while ○ and ● show the data obtained by using alumina A42-6 as the ceramic grains.
Figure 9:
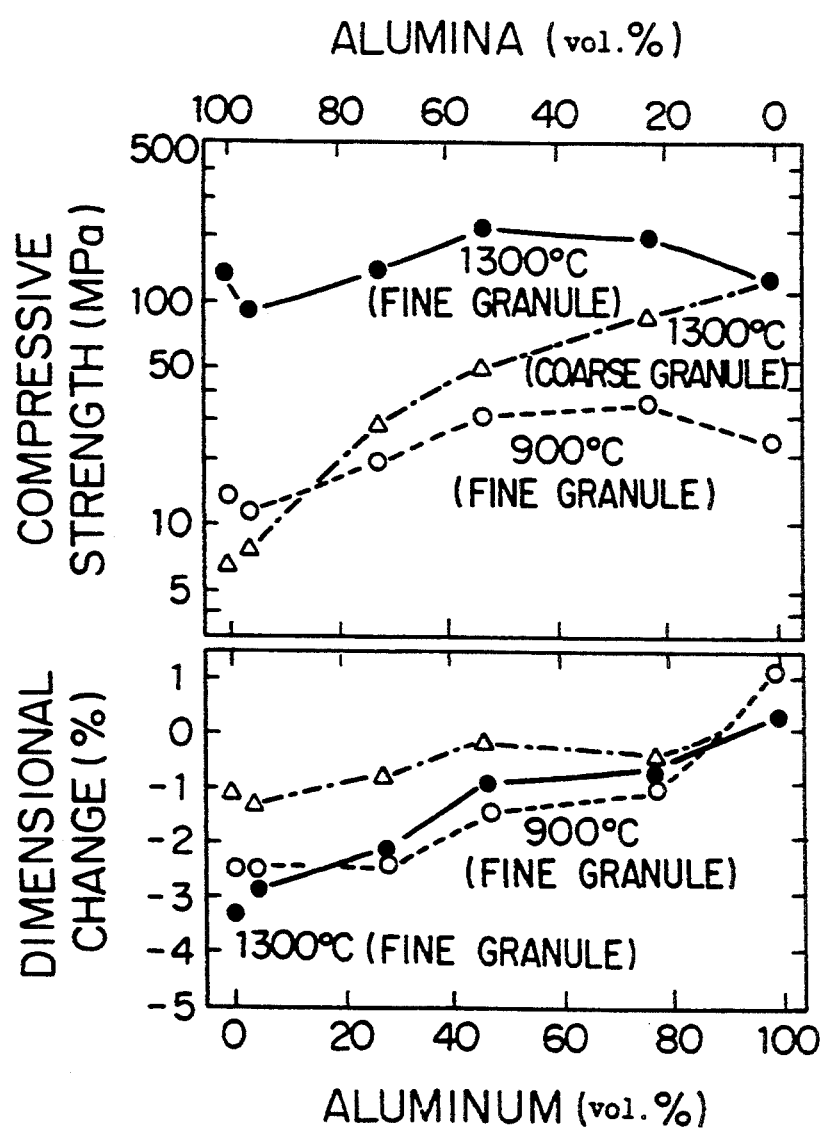
FIG. 9 is a graph that shows the compressive strengths and the dimensional changes of a molded aluminum-alumina product obtained by sintering the molded product in a gaseous atmosphere.
Figure 10:
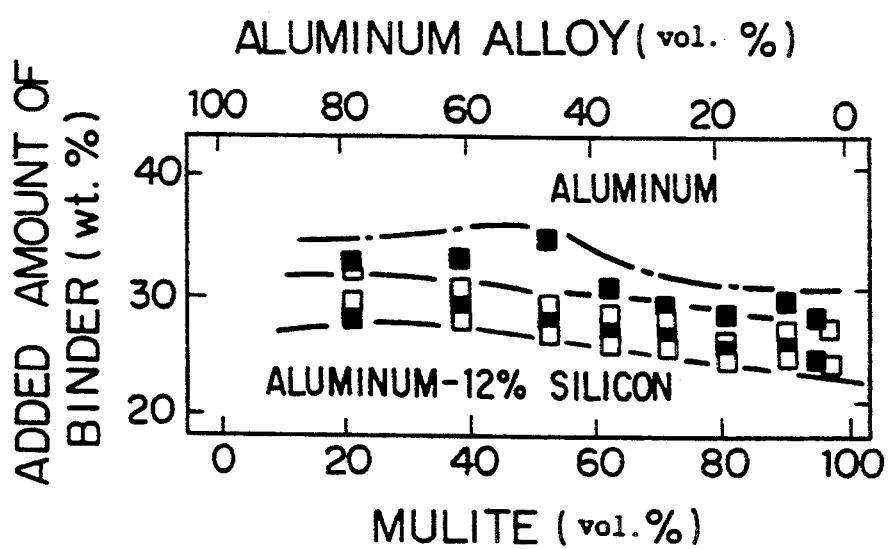
FIG. 10 is a graph that shows the amount of a binder necessary for forming a slurry of a mixture of aluminum or an aluminum alloy and mulite. In this graph ■ shows the data obtained by aluminum as the metal grains, while □ shows the data obtained by aluminum-12% silicon as the metal grains.
Figure 11:
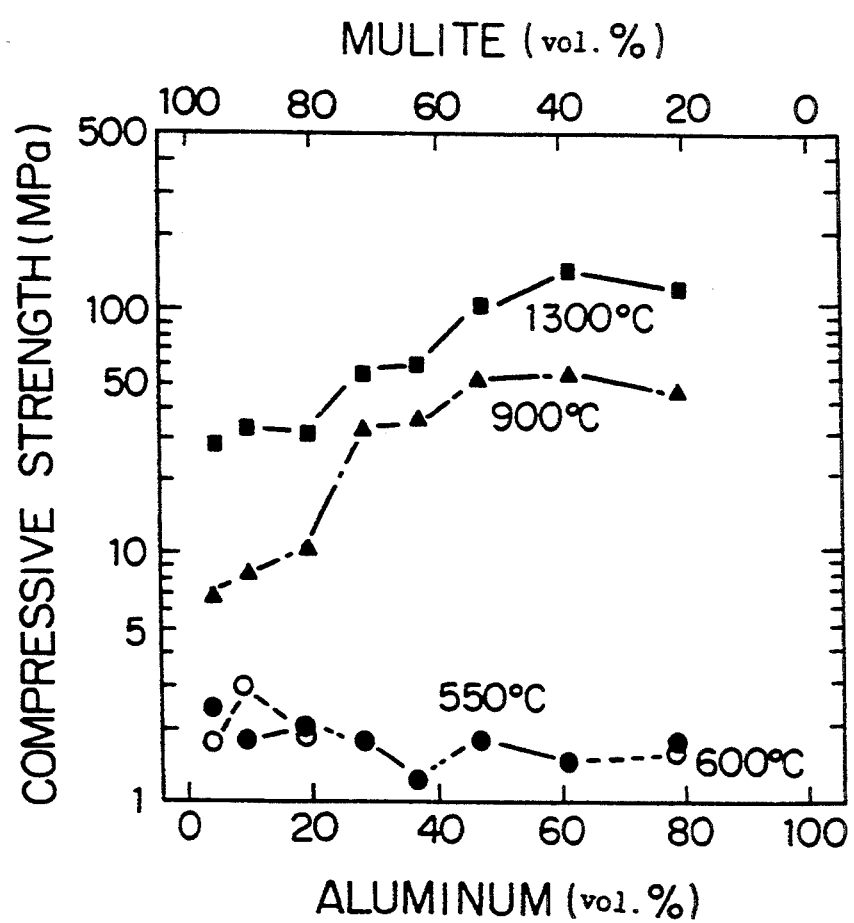
FIG. 11 is a graph that shows the compressive strengths of an aluminum/mulite molded product obtained by sintering the molded product in the atmosphere.
Figure 12:
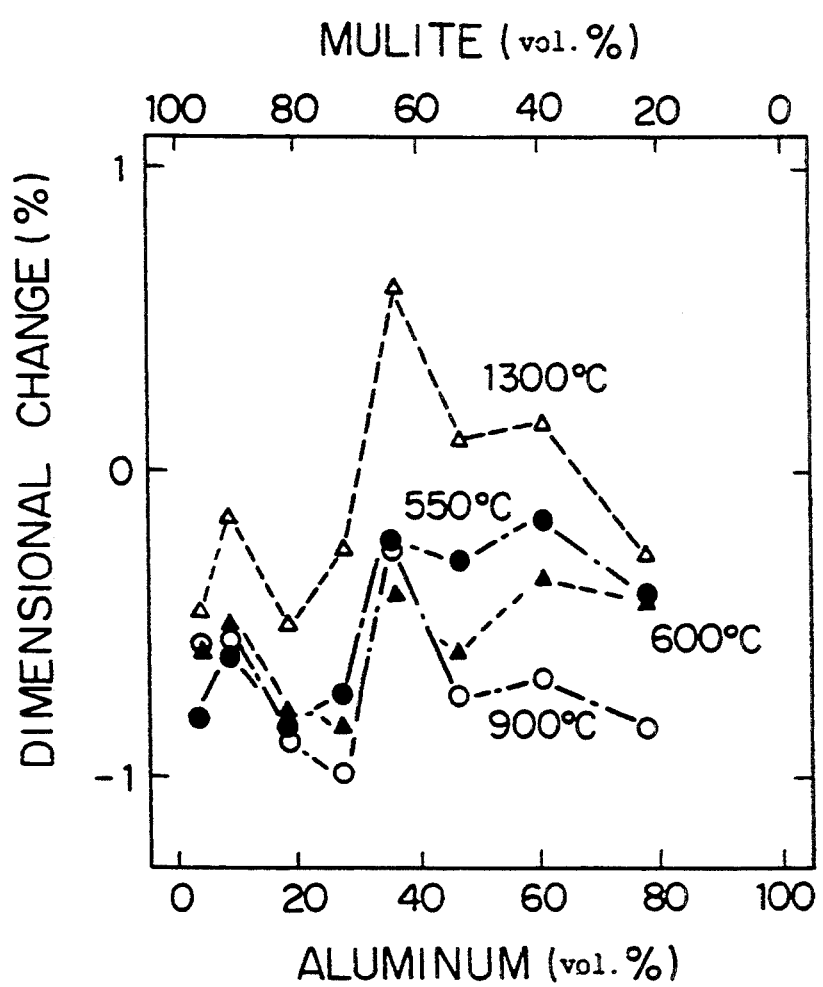
FIG. 12 is a graph that shows the dimensional changes of a molded aluminum/mulite product obtained by sintering the molded product in the nitrogen atmosphere.
Figure 13:
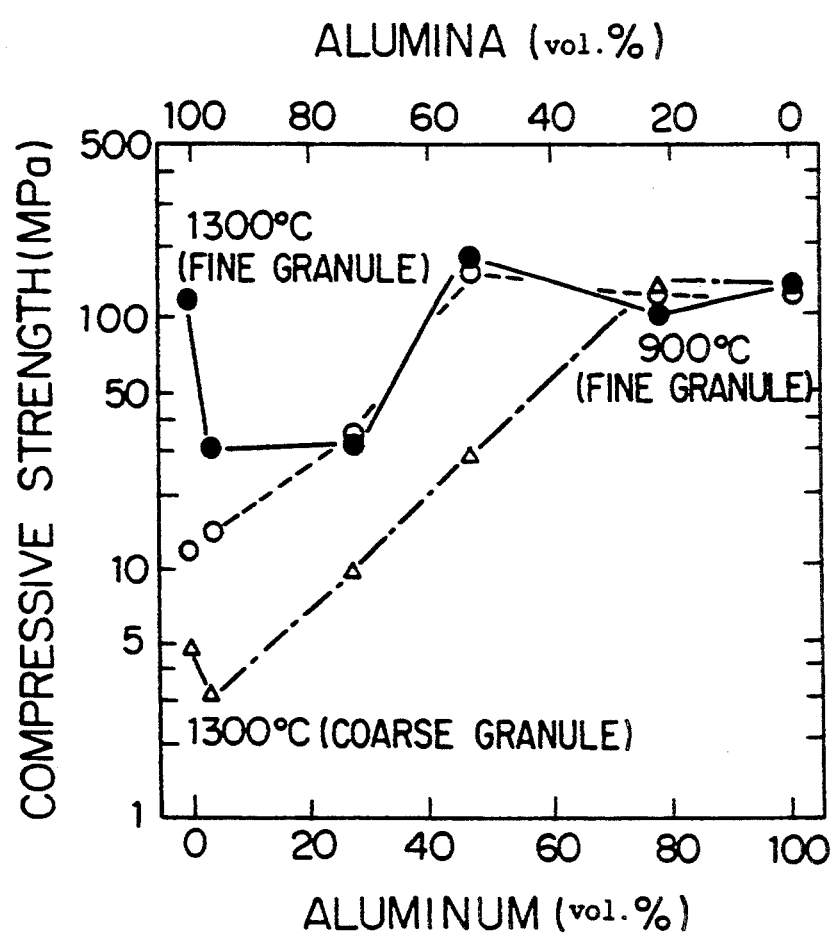
FIG. 13 is a graph that shows the compressive strengths of an aluminum/alumina molded product obtained by sintering the molded product in a nitrogen atmosphere.
Figure 14:
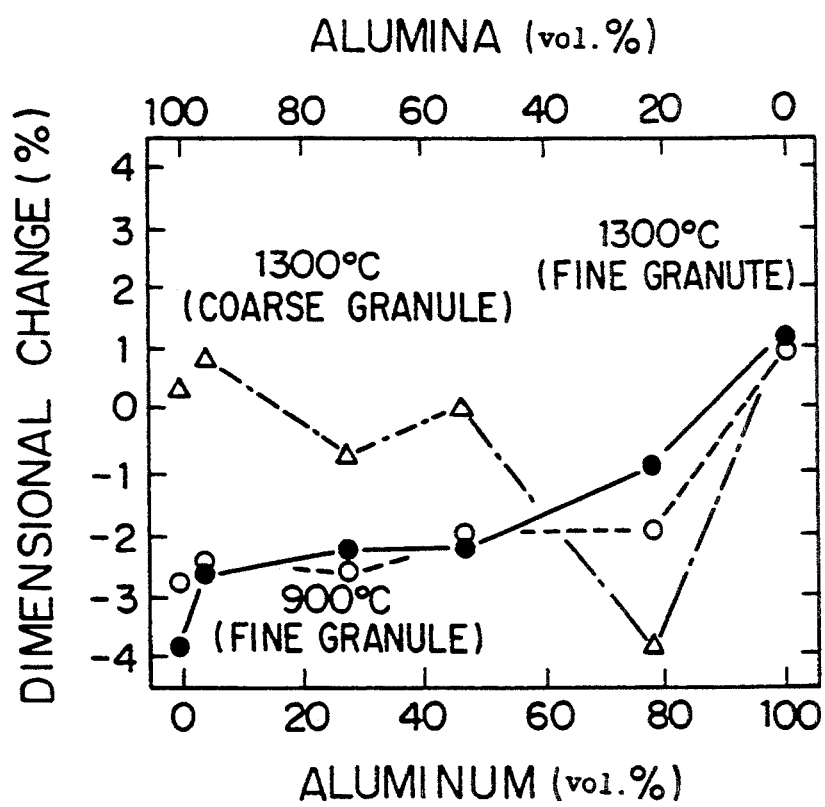
FIG. 14 is a graph that shows the dimensional changes of an aluminum/alumina molded product obtained by sintering in a nitrogen atmosphere.
Figure 15:
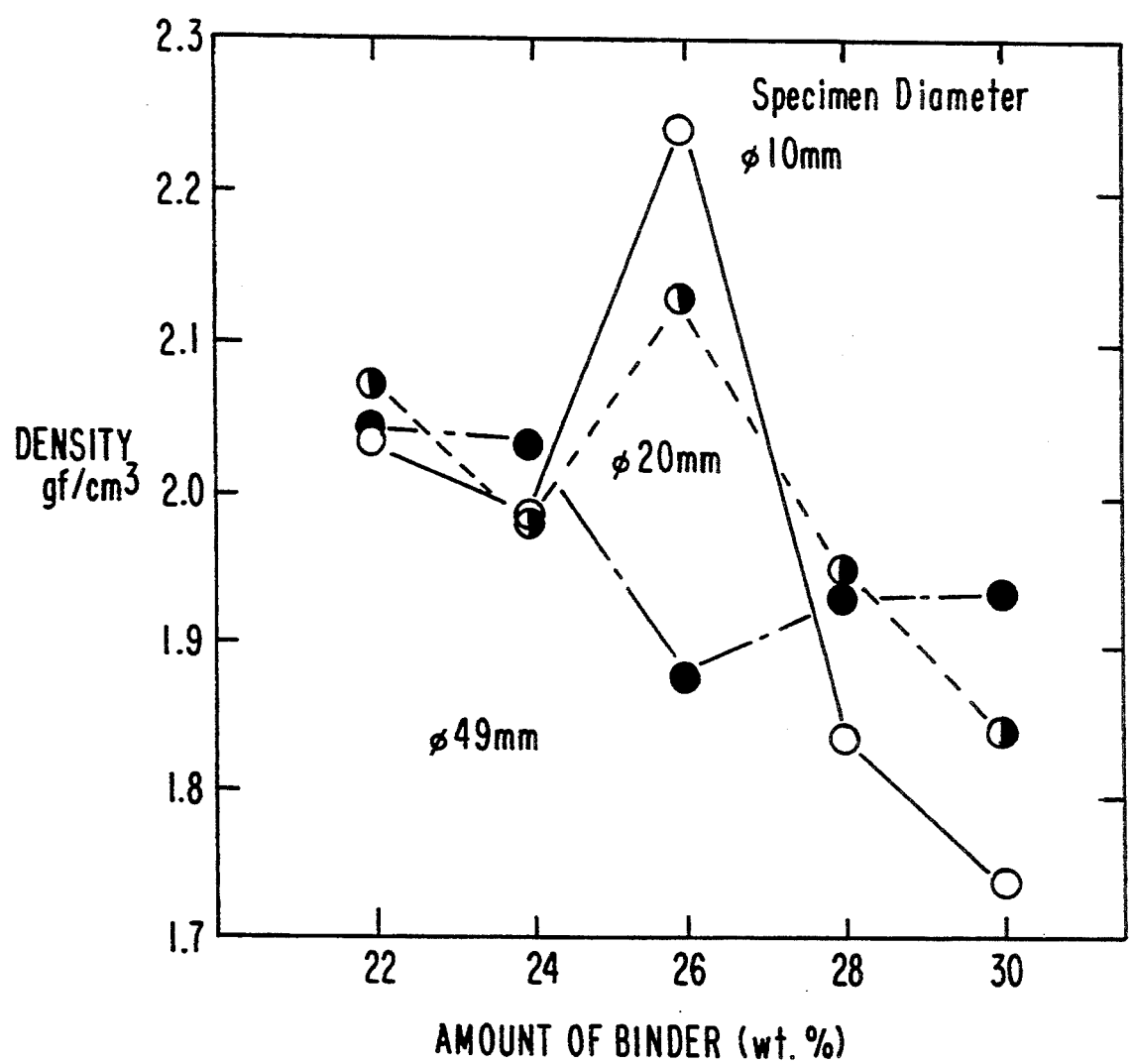
FIG. 15 is a graph that shows the effect of a binder on the density of an alumina-37% aluminum-molded product.
Figure 16:
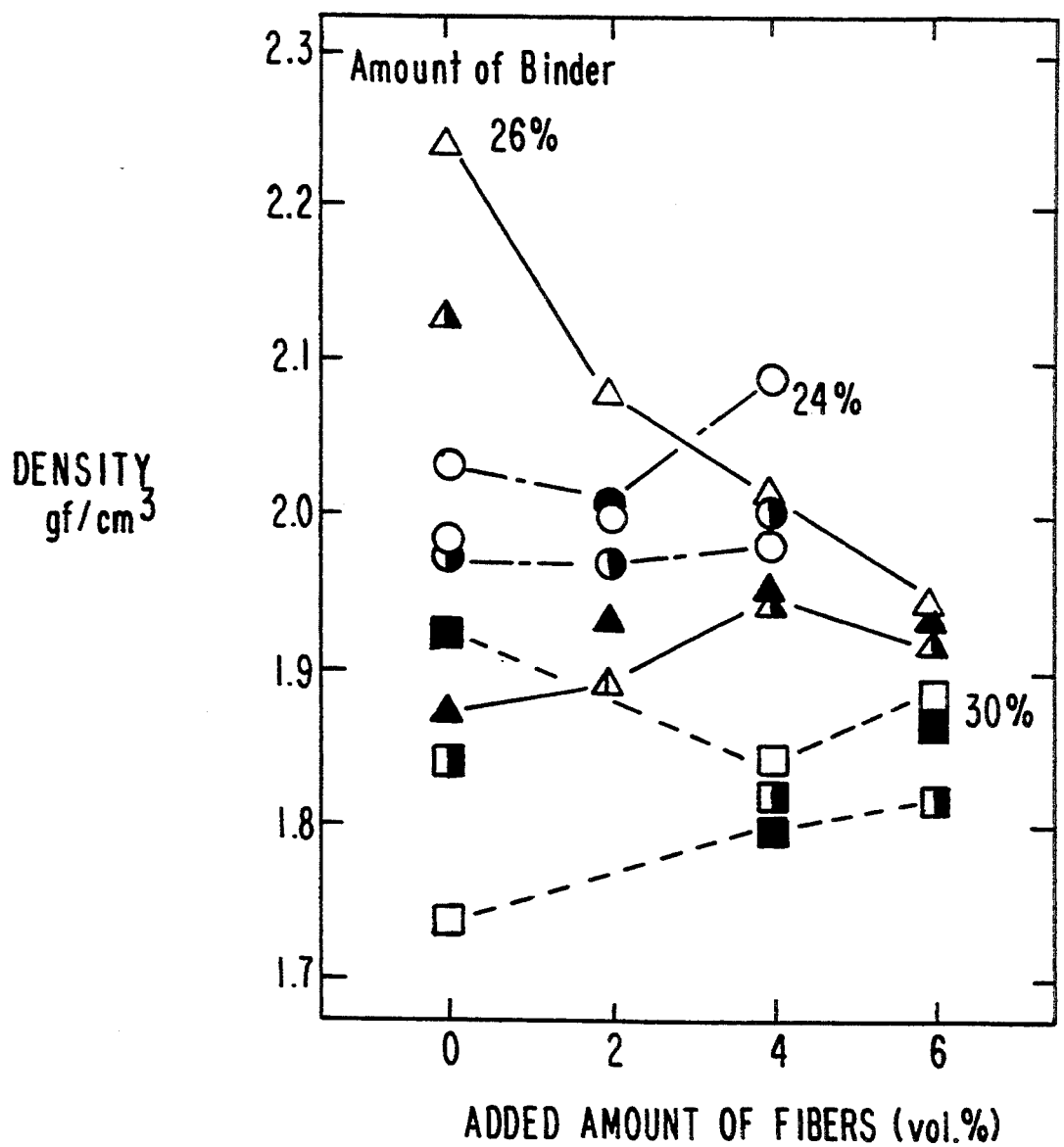
FIG. 16 is a graph that shows the effect of fibers on the density of an alumina-37% aluminum-molded product.

In those graphs fine grain means the case where an alumina having an average grain diameter of 4 μm was used and coarse grain means the case where an alumina having an average grain diameter of 44 μm was used.

One skilled in the art will appreciate that the present invention can be practiced by other than the described embodiments, which are presented for the purposes of illustration and not of limitation, and that the present invention is limited only by the claims that follow.

We claim:

1. A process for preparing a ceramic porous body characterized by using metal grains and ceramic grains, as an aggregate, comprising the steps of:

compounding the metal grains in an amount selected from the range of above 0 to 100% by volume of the total amount of the metal grains and ceramic grains, and the ceramic grains in an amount selected from the range of 0 to below 100% by volume of the total amount of the metal grains and ceramic grains;

mixing the metal grains and the ceramic grains with a binder in a weight ratio of 10–80% of the total amount of the metal grains and ceramic grains with stirring to obtain a slurry mixture;

casting the thus-obtained slurry mixture in a mold;

solidifying the cast product to form a molded product;

subjecting the thus-obtained product to initial consolidation through air drying and/or primary calcination, wherein the method of primary calcination is selected from the following groups of methods: direct ignition and vacuum calcination; and sintering the thus-obtained product in a gas atmosphere at a temperature equal to or above the melting point of the metal grains, and a temperature below the melting point or below the decomposition temperature of the ceramic grains.

2. A process for preparing a ceramic porous body characterized by using metal grains and ceramic grains, as an aggregate, comprising the steps of:

compounding the metal grains in an amount selected from the range of above 0 to 100% by volume of the total amount of the metal grains and ceramic grains, and the ceramic grains in an amount selected from the range of 0 to below 100% by volume of the total amount of the metal grains and ceramic grains;

adding fibers in an amount of below 50% by volume based on the total amount of the metal grains and ceramic grains with a binder in a weight ratio of 10–80% of the total amount of the metal grains, the ceramic grains, and fibers to the thus-obtained product;

mixing the thus-obtained product with stirring to obtain a slurry mixture;

casting the thus-obtained slurry mixture in a mold;

solidifying the cast product to form a molded product;

subjecting the thus-obtained product to initial consolidation through air drying and/or primary calcination, wherein the method of primary calcination is selected from the following groups of methods: direct ignition and vacuum calcination; and sintering the thus-obtained product in a gas atmosphere at a temperature equal to or above the melting point of the metal grains, and a temperature below the melting point or below the decomposition temperature of the ceramic grains.

3. The process for preparing a ceramic porous body of claim 1 characterized in that the metal grains are materials that can be reaction-sintered with the atmospheric gas and in that heating and sintering are conducted at a temperature that causes reaction sintering.

4. The process for preparing a ceramic porous body of claim 2 characterized in that the metal grains are materials that can be reaction-sintered with the atmospheric gas and in that heating and sintering are conducted at a temperature that causes reaction sintering.

5. A process for preparing a ceramic porous body characterized by using metal grains that can be reaction-sintered with a gas atmosphere, and ceramic grains, as an aggregate, comprising the steps of:

compounding the metal grains in an amount selected from the range of above 0 to 100% by volume of the total amount of the metal grains and ceramic grains, and the ceramic grains in an amount selected from the range of 0 to below 100% by volume of the total amount of the metal grains and ceramic grains;

mixing the metal grains and the ceramic grains with a binder in a weight ratio of 10–80% of the total amount of the metal grains and ceramic grains with stirring to obtain a slurry mixture;

casting the thus-obtained slurry mixture in a mold; and solidifying the cast product to form a molded product;

subjecting the thus-obtained product to initial consolidation through air drying and/or primary calcination, wherein the method of primary calcination is selected from the following groups of methods: direct ignition and vacuum calcination; and sintering the thus-obtained product in a gas atmosphere so that the ceramic grains that are dispersed between the metal grains react with the metal grains at a temperature that causes the reaction sintering to produce a composite phase consisting of a compound of the metal grains, one or more kinds of light elements that constitute the ceramic grains, and one or more kinds of metal compounds that constitute the ceramic grains.

6. A process for preparing a ceramic porous body characterized by using metal grains that can be reaction-sintered with a gas atmosphere, and ceramic grains, as an aggregate, comprising the steps of:

compounding the metal grains in an amount selected from the range of above 0 to 100% by volume of the total amount of the metal grains and ceramic grains, and the ceramic grains in an amount selected from the range of 0 to below 100% by volume of the total amount of the metal grains and ceramic grains;

adding fibers in an amount of below 50% by volume based on the total amount of the metal grains and ceramic grains with a binder in a weight ratio of 10–80% of the total amount of the metal grains, the ceramic grains, and fibers to the thus-obtained product;

mixing the thus-obtained product with stirring to obtain a slurry mixture;

casting the thus-obtained slurry mixture in a mold;

solidifying the cast product to form a molded product;

subjecting the thus-obtained product to initial consolidation through air drying and/or primary calcination, wherein the method of primary calcination is selected from the following groups of methods: direct ignition and vacuum calcination; and sintering the thus-obtained product in a gas atmosphere so that the ceramic grains that are dispersed between the metal grains react with the metal grains at a temperature that causes the reaction sintering to produce a composite phase consisting of a compound of the metal grains, one or more kinds of light elements that constitute the ceramic grains, and one or more kinds of metal compounds that constitute the ceramic grains .

7. A process for preparing a ceramic porous body characterized by using metal grains and ceramic grains, as an aggregate, comprising the steps of:

compounding the metal grains in an amount selected from the range of above 0 to 100% by volume of the total amount of the metal grains and ceramic grains, and the ceramic grains in an amount selected from the range of 0 to below 100% by volume of the total amount of the metal grains and ceramic grains;

mixing the metal grains and the ceramic grains with a binder in a weight ratio of 10–80% of the total amount of the metal grains and ceramic grains with stirring to obtain a slurry mixture;

casting the thus-obtained slurry mixture in a mold;

solidifying the cast product to form a molded product;

subjecting the thus-obtained product to primary calcination, wherein the method of primary calcination is selected from the following group of methods: direct ignition and vacuum calcination; and sintering the thus-obtained product in a gas atmosphere at a temperature equal to or above the melting point of the metal grains, and a temperature below the melting point or below the decomposition temperature of the ceramic grains.

8. A process for preparing a ceramic porous body characterized by using metal grains and ceramic grains, as an aggregate, comprising the steps of:

compounding the metal grains in an amount selected from the range of above 0 to 100% by volume of the total amount of the metal grains and ceramic grains, and the ceramic grains in an amount selected from the range of 0 to below 100% by volume of the total amount of the metal grains and ceramic grains;

adding fibers in an amount of below 50% by volume based on the total amount of the metal grains and ceramic grains with a binder in a weight ratio of 10–80% of the total amount of the metal grains, the ceramic grains, and fibers to the thus-obtained product;

mixing the thus-obtained product with stirring to obtain a slurry mixture;

casting the thus-obtained slurry mixture in a mold;

solidifying the cast product to form a molded product;

subjecting the thus-obtained product to primary calcination, wherein the method of primary calcination is selected from the following group of methods: direct ignition and vacuum calcination; and sintering the thus-obtained product in a gas atmosphere at a temperature equal to or above the melting point of the metal grains, and a temperature below the melting point or below the decomposition temperature of the ceramic grains.

9. A process for preparing a ceramic porous body characterized by using metal grains that can be reaction-sintered with a gas atmosphere, and ceramic grains, as an aggregate, comprising the steps of:

compounding the metal grains in an amount selected from the range of above 0 to 100% by volume of the total amount of the metal grains and ceramic grains, and the ceramic grains in an amount selected from the range of 0 to below 100% by volume of the total amount of the metal grains and ceramic grains;

mixing the metal grains and the ceramic grains with a binder in a weight ratio of 10–80% of the total amount of the metal grains and ceramic grains with stirring to obtain a slurry mixture;

casting the thus-obtained slurry mixture in a mold; and solidifying the cast product to form a molded product;

subjecting the thus-obtained product to primary calcination, wherein the method of primary calcination is selected from the following group of methods: direct ignition and vacuum calcination; and sintering the thus-obtained product in a gas atmosphere so that the ceramic grains that are dispersed between the metal grains react with the metal grains at a temperature that causes the reaction sintering to produce a composite phase consisting of a compound of the metal grains, one or more kinds of light elements that constitute the ceramic grains, and one or more kinds of metal compounds that constitute the ceramic grains.

10. A process for preparing a ceramic porous body characterized by using metal grains that can be reaction-sintered with a gas atmosphere, and ceramic grains, as an aggregate, comprising the steps of:

compounding the metal grains in an amount selected from the range of above 0 to 100% by volume of the total amount of the metal grains and ceramic grains, and the ceramic grains in an amount selected from the range of 0 to below 100% by volume of the total amount of the metal grains and ceramic grains;

adding fibers in an amount of below 50% by volume based on the total amount of the metal grains and ceramic grains with a binder in a weight ratio of 10–80% of the total amount of the metal grains, the ceramic grains, and fibers to the thus-obtained product;

mixing the thus-obtained product with stirring to obtain a slurry mixture;

casting the thus-obtained slurry mixture in a mold;

solidifying the cast product to form a molded product;

subjecting the thus-obtained product to primary calcination, wherein the method of primary calcination is selected from the following group of methods: direct ignition and vacuum calcination; and sintering the thus-obtained product in a gas atmosphere so that the ceramic grains that are dispersed between the metal grains react with the metal grains at a temperature that causes the reaction sintering to produce a composite phase consisting of a compound of the metal grains, one or more kinds of light elements that constitute the ceramic grains, and one or more kinds of metal compounds that constitute the ceramic grains.

* * * * *

UNITED STATES PATENT AND TRADEMARK OFFICE
CERTIFICATE OF CORRECTION

PATENT NO.  : 5,437,832
DATED       : August 1, 1995
INVENTOR(S) : Masato Imamura et al.

It is certified that error appears in the above-indentified patent and that said Letters Patent is hereby corrected as shown below:

Cover page, column 2, after "TiN", "for" should be -- from --.

Column 9, line 7, "added ceramic grains" should be deleted.

Column 6, line 30, "900°C" should be -- 850°C --.

Column 6, line 67, after "823K", add -- (550°C) --.

Column 6, line 68, after "873K", add -- (600°C) --.

Column 7, line 2, "550°C" should be -- 900°C --.

Column 7, line 3, "600°C" should be -- 1300°C --.

Column 7, line 22, "1537°K" should be -- 1573°C --.

Signed and Sealed this

Sixteenth Day of March, 1999

Attest:

*Attesting Officer*

Q. TODD DICKINSON

*Acting Commissioner of Patents and Trademarks*